United States Patent [19]
Bright et al.

[11] 3,830,484
[45] Aug. 20, 1974

[54] ADJUSTABLE DEVICE FOR IMPROVED CLAMPING MEANS

[76] Inventors: Stephen A. Bright, 97 Overla Dr., West Milton, Ohio 45383; Robert E. Kress, 4588 S. Shiloh Rd., Laura, Ohio 45337

[22] Filed: Oct. 11, 1972

[21] Appl. No.: 296,608

[52] U.S. Cl. .................. 269/10, 85/50 AT, 269/91, 269/93
[51] Int. Cl. ............................................ B23q 3/00
[58] Field of Search ........... 269/315, 316, 317, 318, 269/319, 320, 321, 91, 93, 94, 10, 291, 297, 303; 248/359, 188.2; 211/177; 85/50 AT

[56] References Cited
UNITED STATES PATENTS

| | | | |
|---|---|---|---|
| 1,940,278 | 12/1933 | Walker | 269/321 |
| 2,052,063 | 9/1936 | Wenn | 85/50 R |
| 2,585,569 | 2/1952 | Menneely et al. | 85/50 AT |
| 2,650,523 | 9/1953 | Zwick | 269/93 |

Primary Examiner—Granville Y. Custer, Jr.
Assistant Examiner—Craig R. Feinberg
Attorney, Agent, or Firm—Melvin Wiviott

[57] ABSTRACT

A device used in conjunction with a clamping bar or strap to act as a support and leverage means for said clamping bar or strap to obtain maximum clamping force against a workpiece and thereby keep it from movement.

The device is finely adjustable in length and provides great physical stability by means of an interaction between two bodies; each body having a series of steps dropping sequentially to a specified depth in the form of a helix like angle. The steps of each body mesh with complementary steps of the other body so that rotation of one body about its longitudinal axis in one direction with respect to the other body will cause it to go "up the steps" of the other body, thereby increasing the overall length of the device; rotation in the opposite direction has a converse effect and decreases the length of the device.

6 Claims, 5 Drawing Figures

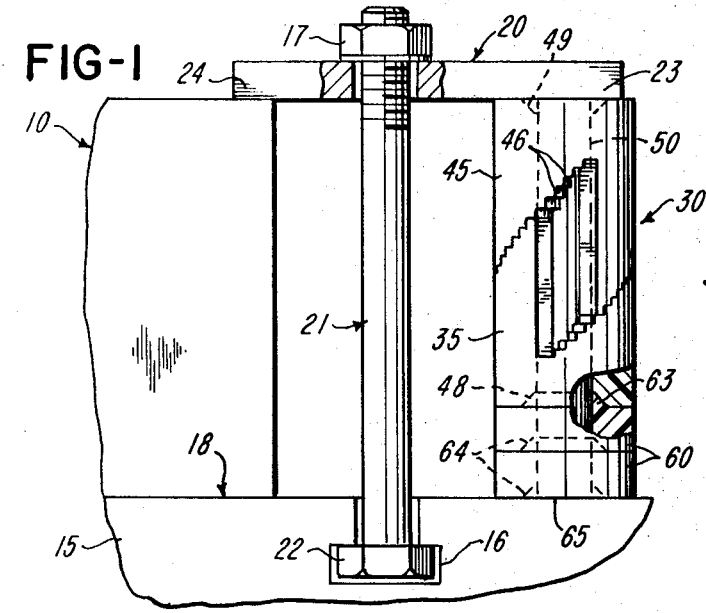
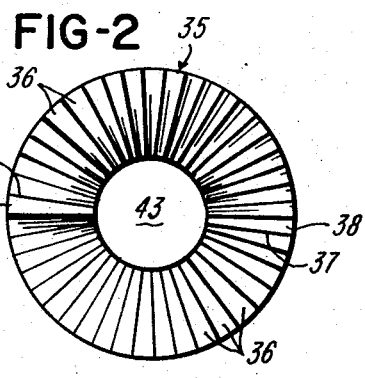
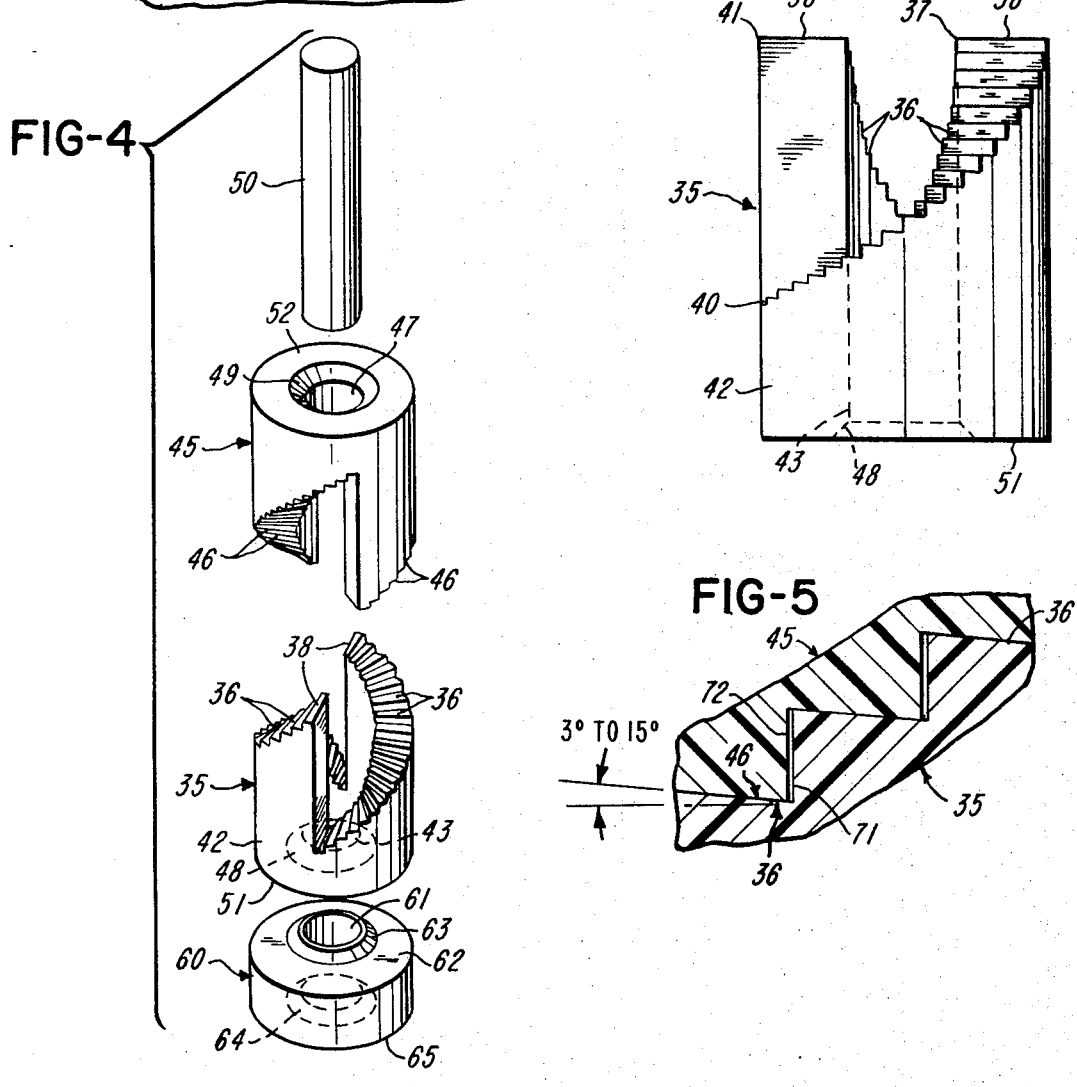

ADJUSTABLE DEVICE FOR IMPROVED CLAMPING MEANS

This invention relates to an adjustable device which is used in conjunction with a clamp bar (or strap) holding a workpiece. This device helps support and provide leverage for the clamp bar enabling it to exert a maximum clamping force against the workpiece to hold it in a fixed position. The workpiece being held could be undergoing machining operations such as those utilizing drill presses, lathes, shapers, milling machines and rotary grinders. This adjustable device could also be used in other areas, such as holding an item firmly on an optical inspection table, where firm clamping action utilizing a compact holding setup is desired.

The greater the pressure a clamp exerts on a workpiece, the less likelihood there is of the workpiece moving. The maximum force of a clamp bar holding a workpiece against a table bed occurs when this clamp bar is basically parallel to the table bed. A force pulling the parallel oriented clamp bar toward the table bed, such as by a bolt and nut means, is then translated into components of force by that clamp bar which are literally all perpendicular to the table bed; and maximum pressure by these components of force is exerted against the workpiece forcing it toward the table bed. If the clamp bar is transverse the table bed instead of parallel to it, the force pulling the clamp toward the table bed is translated into both perpendicular and parallel components of force with respect to the table bed which disipates the total perpendicular force against the workpiece. Thus, it is obvious the force of the clamp bar against the workpiece forcing it towards the table bed is less when the clamp bar is transverse the table bed than when the clamp bar is parallel to the table bed.

In order to obtain maximum clamping pressure, the inventive adjustable device is used in conjunction with the clamping bar. This device supports the clamping bar and acts as a fulcrum when it is in abutment against an end portion of this clamping bar which is opposite the end portion holding the workpiece. The clamping bar is supported by this device in a position as close as possible to making it parallel to the table bed. Under ideal conditions, the overall height of the adjustable device can be adjusted so that it is exactly the same height as the workpiece and consequently the clamping bar is held in an exact parallel position with relationship to the table bed. When an exact parallel adjustment cannot be made, the device is adjustable within very close tolerances and is capable of being adjusted to a height slightly higher than the workpiece. This causes the clamp bar to exert a slight component of force against the workpiece which is parallel to the table bed. In effect, this may be somewhat beneficial since the edge of the clamp bar against the workpiece would then have a tendency to slightly "dig in" or "bite" into the workpiece.

One type of support and leveling device that has been used in the past is a metal block which is abutted up against the clamp bar or strap from the table bed of the machine. Since different workpieces have different heights, the clamp must be raised or lowered varying distances from the table bed. It is mandatory, therefore, to have a relatively large number of individual different sized blocks in order to be able to pick a block having a height compatible with the workpiece. Simetimes combinations of blocks are used, one on top of the other, in order to obtain the correct height. This leads to an unstable physical condition with possibilities of tipping and shifting of the block(s). The use of these block(s) also requires a flat horizontal machine surface for the block(s) to rest on.

Another type of support device previously conceived consists of a block having steps notched into one side. The steps literally go up the side of the block in a manner similar to steps going up a straight stair case. These steps have a meshing interaction with the end portion of a clamp bar having a compatible series of steps notched into it. As can be seen, it is necessary to have a special clamp bar with steps on it to mesh with the steps on the block in order for the clamp to be raised or lowered by going up and down the block steps. This type of device leads to an unstable physical condition with a tendency of the support device to tip and shift, especially at the upper step levels of the block. Also, a flat horizontal machine surface is required for the block to rest on.

Still another type of support device consists of two step blocks, each having a series of steps notched therein. The steps of each of the blocks have a meshing interaction with each other. Moving one of the blocks in relation to the other, which lies on the machine bed, so that it goes "up the stair case" raises the height of the combined blocks; and moving it downward reduces the height. This type of device again has unstable characteristics, particularly at the upper end of the "stair case" where fewer steps mesh and the tendency to tilt becomes more pronounced. A flat horizontal machine surface is required for the lower block to rest upon.

A more complex technique has been broached for applying additional force on the clamp. It requires the use of a device which contains a ratchet type of mechanism. This device works in a manner similar to an automobile jack with the teeth in the shank going up or down compatible teeth in the base. This type of fulcrum is more complex and relatively expensive to make. There is a greater tendency for tilting or shifting the higher the fulcrum is raised. In addition, this type of fulcrum is not very compact and requires a flat horizontal machine surface to rest upon.

To avoid the problems discussed above, it is desirable to provide a unique type of device to be used in conjunction with a holding clamp bar (or strap) for purpose of providing parallel leveling and leverage for that clamp bar to exert a maximum clamping force against a work piece.

A feature of the subject invention is to provide a novel adjustable device comprising two bodies interacting with each other to provide great flexibility in increasing or decreasing the total height of the device in relatively small increments of change while at the same time having great physical stability.

Another feature of this invention is the capability of the subject device to have great stability while it rests on a surface that is not in a horizontal plane. This would be required when the work piece is clamped to a sine or angle plate surface set up transverse to a horizontal plane.

Still another feature of this invention is to provide a device comprising two bodies having a step meshing interaction to increase and decrease the overall length of the device which incorporates steps arranged in a helix angle to dissipate clamp pressure over a relatively large step surface area strategically located in order to maintain great physical stability.

An additional feature of this invention is the maintenance of a specified step meshing interaction between two bodies to prevent slippage of one body from the other by interlocking means holding the complementary steps of the bodies together when pressure is exerted thereon.

A further feature of this invention is to provide a device that is compact and easy to use as well as having great physical stability.

An additional feature of this invention is the use of dowel insert and spacer elements to further add flexibility in increasing the maximum height of the subject device and maintain its physical stability.

Other features and advantages of the invention will be apparent from the following description taken in conjunction with the accompanying drawings wherein:

FIG. 1 is a view in elevation showing a section of a machine tool table with a work piece clamped to it by clamping means utilizing an adjustable device in conformance with the present invention;

FIG. 2 is a top plan view of one of the bodies comprising the adjustable device;

FIG. 3 is a side elevational view of the body shown by FIG. 2;

FIG. 4 is an isometric exploded view of an adjustable device showing various component parts;

FIG. 5 is an enlarged sectional view of the meshing steps of two bodies showing the pressure carrying surface of each step sloping at a slight acute angle forming interlocking means which prevent the meshing steps from slipping apart under pressure.

In the embodiment shown by FIG. 1, a work piece 10 is clamped onto machine tool table 15 and kept from moving by clamping means comprising a clamping bar (or strap) 20, a bolt 21 and adjustable device 30. The bolt 21 has a square, or other suitably shaped head 22 engaged within a T-slot 16 of machine tool table 15. This engagement securely anchors bolt 21 to table 15 as well as preventing it from turning with respect to this table. Convenient adjustment of bolt 21 can be made by movement of bolt head 22 along table slot 16.

Bolt 21 penetrates through a hole in clamping bar 20 and is threadedly engaged to nut 17. By rotating nut 17 in one direction about the longitudinal axis of bolt 21, said nut is drawn against clamping bar 20 which is pushed toward table 15 until contact is made with work piece 10 and adjustable device 30. Increasing the turning force on nut 17 increases the pressure of said nut against abutting clamping bar 20. This in turn causes clamping bar 20, in conjunction with adjustable device 30, to increase its pressure against work piece 10 and to keep it from moving about on table 15. If nut 17 is rotated in the opposite direction, the pressure of nut 17 against clamp bar 20 is reduced and clamping action is obviously released.

In order to get the best clamping action possible on work piece 10, device 30 is adjusted to a height which causes it to abut clamping bar 20 at end portion 23 which is opposite end portion 24 of said clamping bar abutting work piece 10. This abutment by adjustable device 30 against said clamping bar 20 acts as a fulcrum to support said clamping bar. By correct adjustment in the height of device 30, it positions clamping bar 20 so that it is in a plane approximately parallel to the surface 18 of table 15.

The adjustable device 30 comprises bodies 35 and 45 which interact with each other to increase or decrease the overall height of that device.

As shown by FIGS. 2 and 3, body 35 has a series of steps 36 which start dropping sequentially in a clockwise direction from step edge 37 on end portion 38 to a specified depth 40 in the form of a 180° helix like angle. A similar series of steps start dropping from end portion 38 at step edge 41, which is 180 degree displaced from step edge 37. Body 45 (FIG. 1) comprises an equivalent series of steps which are complementary to the steps in body 35. It is obvious that the helix like angles could vary from the 180° magnitude; however, the 180° angle gives maximum interaction between bodies 35 and 45 when their respective steps mesh with each other in comprising device 30. In addition, the series of steps could drop in a counterclockwise direction as well as a clockwise direction when forming the helix like angles.

FIGS. 1 and 4 show the arrangement of bodies 35 and 45 with relationship to each other when comprising device 30. Steps 36 of body 35 mesh with complementary steps 46 of body 45. When either body 35 or 45 is rotated about its longitudinal axis in a clockwise direction with respect to the other body, the bodies "go down the steps" with respect to each other (bodies approach each other) and the overall height of device 30 is decreased. Rotation in the opposite, or counterclockwise direction will cause the bodies to "go up the steps" with respect to each other and increase the overall height of device 30. It should be noted that if the helix like angle of the steps is constructed so it goes in the opposite direction from that shown by FIGS. 3 and 4, rotation about their longitudinal axis of the bodies with respect to each other would similarly reverse whether the device 30 increases or decreases in height.

Although bodies 35 and 45 are shown as basically cylindrical in shape, they can take various forms as long as the steps in each body have the freedom to mesh with complementary steps in the other body. For example, the base portion 42 of body 35 could be square rather than cylindrical in shape.

For increased stability of device 30, dowel-like insert 50 can be inserted through complementary grooves or holes 43 and 47 circumscribing the longitudinal axis of each of bodies 35 and 45, respectively, and penetrating completely through each of these bodies. The dowel-like insert 50 is simultaneously within grooves 43 and 47 of both bodies 35 and 45 and thereby holds these bodies in concentric alignment with each other as well as providing great physical strength and stability for adjustable device 30.

Also shown by FIG. 4 is spacer element 60 which is used when additional height is required by adjustable device 30. The spacer elements can be of various configurations. Spacer element 60 is a preferred configuration and defines a groove or hole 61 which circumscribes the longitudinal axis of said spacer. About the groove extending through end face 62 of spacer 60 can be a raised beveled edge 63. The raised beveled edge 63 is complementary to recessed beveled edges 48 and 49 about grooves 43 and 47 on end portions 51 and 52 of bodies 35 and 45, respectively. Consequently, spacer 60 can be abutted against either body 35 or 45 with raised beveled edge 63 inserted within either complementary recessed beveled edges 48 or 49. Use of spacer 60 effectively increases the length of adjustable device 30 and because of the beveled edge construction discussed herein provides great stability when used in conjunction with either bodies 35 or 45.

Of course, more than one spacer 60 can be used to further increase the height of adjustable device 30. To maintain stability, each spacer 60 also has a recessed beveled edge 64 on the opposite end face 65 which is complementary to raised beveled edge 63. Consequently, the raised beveled edge 63 of each spacer can be inserted within complementary recessed beveled edge 64 of any other spacer it is abutted against. This again assures great stability when more than one spacer 60 is used in conjunction with bodies 35 and 45 to increase the overall height of adjustable device 30.

To further increase the stability of adjustable device 30 having a spacer(s) therein, dowel-like insert 50 can be inserted through complementary groove or hole 61 of spacer(s) 60. This use of dowel-like insert 50 further holds spacer 60 in alignment with bodies 35 and 45 and greatly enhances the overall stability of adjustable device 30.

Because of the great inherent stability of bodies 35 and 45 meshing with each other, the use of abutting spacers with beveled edges 61 and 63, and insert 50 used in conjunction therewith; the adjustable device has great flexibility in that it can be used to hold work pieces on surfaces transverse to a machine table bed without falling apart. Such a surface upon which the work piece rests could be a sine or angleplate which is transverse to a horizontal machine bed surface.

An additional feature shown by FIG. 5 is an interlocking action between steps 36 and 46 of bodies 35 and 45, respectively, meshing together. Step surface 36 of each step in body 35 forms an acute angle with adjacent surface 71. Surface 71 is normally in a plane parallel to the longitudinal axis of body 35. Step surface 46 of each step in body 45 similarly forms complementary steps to that of body 35. Step surface 46 of each step in body 45 forms an acute angle with adjacent surface 72. This acute angle is compatible to that formed by step surfaces 36 and 71 of body 35. Thus it can be seen that when adjustable device 30 has pressure exerted against it by clamp bar 20 (FIG. 1), step surfaces 36 and 46 of bodies 35 and 45, respectively, press against each other. Because of the acute angle construction of the steps, there is an interlocking or wedgelike holding action. Perpendicular components of force are transmitted against step surfaces 71 and 72 pushing bodies 35 and 45 together and preventing slippage with the steps locked together under pressure. A practical range for the acute angle comprised by the step surfaces 36 and 46 deviating from being perpendicular to step surfaces 71 and 72, respectively, would be 3° to 15°. Variations from this range, however, would be possible.

While certain embodiments of our invention have been shown and described, it is understood that it is capable of many modifications. Changes, therefore, in the construction and arrangement may be made without departing from the spirit and scope of the invention.

We claim:

1. An adjustable device for keeping a clamp tight against a work piece, said adjustable device comprising in combination two bodies each having a first end portion and a second opposite end portion, said first end portion of each of said bodies comprising a series of steps dropping sequentially to a specified depth within each of said bodies to form helix like angles within each of said bodies, said helix like angles of the first of said bodies being complementary to said helix like angles of the second of said bodies, said first end portions of said bodies in abutment with each other with said series of steps and said first of said bodies meshing with said series of complementary steps of said second of said bodies, each of said steps comprised of surfaces forming an actue angle, the meshing of said steps of said first body with said complementary steps of said second body interlocking said complementary steps together when said bodies are subjected to longitudinal pressure forcing said complementary acute angled steps together into a wedgelike holding action which interlocks said complementary steps of said bodies preventing said complementary steps from slipping apart, one of said bodies being movable rotationally about its longitudinal axis with respect to the other of said bodies to disengage and engage complementary steps of each other of said bodies, the longitudinal distance between said second opposite end portions of said bodies being increased by the relative rotational movement in one direction and decreased by the relative rotational movement in the opposite direction, each of said bodies comprising two series of steps each in a configuration of similar helix like angles of a magnitude substantially 180° for each angle sequentially positioned about said longitudinal axis in each of said bodies and being equidistant from and circumscribing said longitudinal axis of each said body, each of said bodies defining a groove therein, said groove basically circumscribing the longitudinal axis of each said body and being the entire longitudinal length of said body with openings defined in said first end portion and said second opposite end portion thereof, the inner edges of said steps circumscribing the longitudinal axis of each said body to coincide with and define said groove, a dowel like insert being of a configuration complementary to the groove defined within each said body, said dowel like insert in combination with said bodies and being simultaneously closely contained within said defined grooves of said bodies and lying within the outer end portions of said bodies to become an integral part of said adjustable device, said bodies being in concentric alignment while encompassing and in abutment with said dowel like insert to form in combination an integrated adjustable device maintaining great physical stability during abutment of said bodies with each other.

2. A device as claimed by claim 1 comprising in combination therewith retention means adapted to be an integral part within said bodies, said retention means keeping said dowel like insert simultaneously within both said bodies and preventing slippage therefrom to maintain said bodies in concentric alignment and great physical stability with respect to each other.

3. An adjustable device for keeping a clamp tight against a work piece, said adjustable device comprising in combination two bodies each having a first end portion and a second opposite end portion, said first end portion of each of said bodies comprising a series of steps dropping sequentially to a specified depth within each of said bodies to form helix like angles within each of said bodies, said helix like angles of the first of said bodies being complementary to said helix like angles of the second of said bodies, said first end portions of said bodies in abutment with each other with said series of steps of said first of said bodies meshing with said series of complementary steps of said second of said bodies, each of said steps comprised of surfaces forming an acute angle, the meshing of said steps of said first body with said complementary steps of said second body interlocking said complementary steps together when said bodies are subjected to longitudinal pressure forcing said complementary acute angled steps together into a wedgelike holding action which interlocks said complementary steps of said bodies preventing said complementary steps from slipping apart, one of said bodies being movable rotationally about its longitudinal axis with respect to the other of said bodies to disengage and engage complementary steps of the other of said bodies, the longitudinal distance between said second opposite end portions of said bodies being increased by the relative rotational movement in one direction and decreased by the relative rotational movement in the opposite direction, each of said bodies comprising two series of steps each in a configuration of similar helix like angles of a magnitude substantially 180° for each angle sequentially positioned about said longitudinal axis in each of said bodies and being equidistant from and circumscribing said longitudinal axis of each said body, each of said bodies defining a groove therein, said groove basically circumscribing the longitudinal axis of each said body and being the entire longitudinal length of said body with openings defined in said first end portion and said second opposite end portion thereof, the inner edges of said steps circumscribing the longitudinal axis of each said body to coincide with and define said groove, a dowel like insert being of a configuration complementary to the groove defined within each said body, said dowel like insert in combination with said bodies and being closely contained within said defined grooves of said bodies to become an integral part of said adjustable device, said bodies being in concentric alignment while encompassing and in abutment with said dowel like insert to form in combination an integrated adjustable device, said device comprising in combination therewith a spacer element adapted for specific utilization therein, said spacer element defining a continuous groove therein with openings on opposite end portions of said spacer element, said spacer element defined groove being of a configuration complementary to said dowel like insert, said dowel like insert being contained longitudinally within said two bodies and said spacer element, said dowel like insert lying within said defined spacer element groove, said spacer like element encompassing said dowel like insert and being oriented in concentric alignment with said two bodies of said device which also encompass said dowel like insert, a first said spacer element end portion being in abutment with an end portion of one of said bodies, said spacer element configured in thickness between said first end portion of said spacer and the second opposite end portion thereof to be equal to or greater than the longitudinal length of that portion of said dowel like insert extending beyond said bodies, said second opposite end portion of said spacer element in abutment with any exterior surface said device is placed against as well as said spacer element first end portion being simultaneously in abutment with said end portion of one of said bodies, said integral combination of said spacer element and said dowel like element in conjunction with said bodies extending the total length of the longitudinal axis of said device while maintaining great strength and stability thereof under compressive force.

4. A device as claimed by claim 3, one of said spacer element end portions being in abutment with an end portion of one of said bodies, said abutting spacer element end portion defining a face configuration complementary to the face configuration of said end portion of said abutting body, said opposite end portion of said spacer element defining a generally flat face lying in a plane relatively perpendicular to said longitudinal axis of said dowel like insert; said device being of increased longitudinal length with great physical stability.

5. A device as claimed by claim 3, said abutting spacer element end portion comprising a raised beveled edge about the groove defined within said spacer, said end portion of said body abutting said spacer element comprising a recessed beveled edge about the groove defined within said body, said raised beveled edge of said spacer element complementary to said recessed beveled edge of said body when said body and said spacer element are in abutment, this abutment of said spacer element and said body increasing the overall length of said adjustable device while maintaining great physical stability therein.

6. A device as claimed by claim 5, said spacer element comprising a recessed beveled edge about the groove defined within said spacer on the end portion thereof opposite said end portion comprising a raised beveled edge, said recessed beveled edge complementary to said raised beveled edge of said spacer element, a multitude of spacer elements stacked together with raised beveled edges inserted into complementary recessed beveled edges, said multitude of spacer elements in integral combination and abutment with said end portion of one of said bodies whereby said raised beveled edge of said spacer element abutting said body is engaged in a close fit with a complementary recessed beveled edge about the groove defined by said body, said multitude of spacer elements configured in cumulative thicknesses to be equal to or greater than the longitudinal length of that portion of said dowel like insert extending beyond said bodies when said spacers are in combination with said dowel like insert and said bodies, said extending portion of said dowel like insert further being of sufficient longitudinal length to be encompassed within at least a portion of the groove of that spacer element in said multitude of spacer elements which is furthest away from said end portion of said body in abutment with said multitude of spacers, this abutment of said multitude of said spacer elements and said body in conjunction with said dowel like insert increasing the overall length of said adjustable device in varying amounts depending on the number and thickness of spacer elements used in conjunction with varying lengths of said dowel like insert while simultaneously maintaining a high degree of stability therein.

* * * * *